United States Patent
Charbonnelle

(10) Patent No.: US 10,287,911 B2
(45) Date of Patent: May 14, 2019

(54) TURBINE ENGINE ROTOR SHAFT COMPRISING AN IMPROVED HEAT EXCHANGE SURFACE

(71) Applicant: SAFRAN AIRCRAFT ENGINES, Paris (FR)

(72) Inventor: Pierre Yves Francois Charbonnelle, Maisons-Alfort (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 586 days.

(21) Appl. No.: 14/947,270

(22) Filed: Nov. 20, 2015

(65) Prior Publication Data

US 2016/0146045 A1    May 26, 2016

(30) Foreign Application Priority Data

Nov. 25, 2014   (FR) .................................... 14 61421

(51) Int. Cl.
*F01D 25/12* (2006.01)
*F01D 5/02* (2006.01)
*F01D 5/06* (2006.01)

(52) U.S. Cl.
CPC .............. *F01D 25/12* (2013.01); *F01D 5/02* (2013.01); *F01D 5/06* (2013.01); *F05D 2220/323* (2013.01); *F05D 2220/36* (2013.01); *F05D 2230/10* (2013.01); *F05D 2230/312* (2013.01); *F05D 2240/60* (2013.01); *F05D 2250/63* (2013.01); *F05D 2260/2214* (2013.01); *F05D 2300/20* (2013.01); *Y02T 50/676* (2013.01)

(58) Field of Classification Search
CPC ................ F01D 25/12; F05D 2240/60; F05D 2260/2214
See application file for complete search history.

(56) References Cited

U.S. PATENT DOCUMENTS 7,614,849 B2 * 11/2009 Schmitz ................ C23C 28/347
                                                                 415/200
7,695,582 B2 *  4/2010 Stowell ................... F01D 5/288
                                                                 156/89.11

(Continued)

FOREIGN PATENT DOCUMENTS

EP       2 093 381 A1    8/2009
EP       2 518 429 A1    10/2012

(Continued)

OTHER PUBLICATIONS

French Preliminary Search Report dated Jul. 14, 2015 in French Application 14 61421, filed on Nov. 25, 2014 (with English Translation of Categories of Cited Documents and Written Opinion).

*Primary Examiner* — Jason D Shanske
*Assistant Examiner* — Brian O Peters
(74) *Attorney, Agent, or Firm* — Oblon, McClelland, Maier & Neustadt, L.L.P.

(57) ABSTRACT

A turbine engine rotor shaft includes at least one portion having an outer periphery having a determined diameter forming a free surface for heat exchange with the environment of said rotor. The outer periphery includes a plurality of irregularities which are designed to provide a heat exchange surface of the shaft of the rotor which is greater than a surface of the periphery of a cylinder having the same determined average diameter.

11 Claims, 2 Drawing Sheets

(56) References Cited

U.S. PATENT DOCUMENTS

| | | | |
|---|---|---|---|
| 8,747,061 B2* | 6/2014 | Kuhn | F01D 25/125 |
| | | | 415/115 |
| 2006/0099073 A1 | 5/2006 | Djeridane et al. | |
| 2009/0180860 A1 | 7/2009 | Bigi et al. | |
| 2013/0008550 A1 | 1/2013 | Brault et al. | |
| 2014/0157751 A1* | 6/2014 | Jackson | F01D 5/023 |
| | | | 60/39.45 |

FOREIGN PATENT DOCUMENTS

| | | | |
|---|---|---|---|
| GB | 790830 | * | 2/1958 |
| WO | WO 2006/029843 A1 | | 3/2006 |
| WO | WO 2011/117560 A2 | | 9/2011 |

* cited by examiner

TURBINE ENGINE ROTOR SHAFT COMPRISING AN IMPROVED HEAT EXCHANGE SURFACE

The field of the present invention is that of gas turbine engines, such as turbine engines, and in particular those intended for the propulsion of aircrafts.

The invention relates more particularly to the thermal behaviour of the internal shafts of a gas turbine engine, in particular an engine of the multi-body type.

Conventionally, turbine engines comprise, from upstream to downstream in the direction of flow of the gases in said turbine engines, one or more compressor modules arranged in series, which compress air sucked into an air inlet. The air is then introduced into a combustion chamber where it is mixed with a fuel and burned. The combustion gases pass through one or more turbine modules which drive the compressor(s) by means of associated turbine shafts. The gases are lastly ejected into a nozzle.

For example, a conventional turbine engine comprises a low-pressure LP compressor and a high-pressure HP compressor, through which a flow of air passes. The rotors of the low-pressure LP and high-pressure HP compressors are each driven by a respectively associated low-pressure LP or high-pressure HP turbine shaft. The low-pressure LP turbine shaft is mounted coaxially inside the high-pressure HP turbine shaft, which in turn is mounted so as to be able to rotate inside a casing or stator of the turbine engine. Each compressor or turbine can consist of a plurality of compressor or turbine stages in series.

The bladings of the LP and HP rotors and the casing are subjected to the temperature of the gases of the stream. The casing surrounds the stream and supports the stator bladings. By contrast, the LP and HP shafts are located in cavities in which there is slight air movement and said shafts are thus subjected to a gradient of thermal expansion which is different from that of the casing. This phenomenon is even more accentuated for a dual-flow-type engine, for which the casing is immersed in a flow of fresh air which is intended to cool it.

In particular, the LP shaft comprises a long portion which extends inside the HP shaft and which is thus very far away from the bladings and the stream. This portion of the LP shaft is therefore subjected to a temperature gradient which is substantially different from the gradient to which the casing is subjected. Such a shaft is disclosed for example by WO 2011/117560-A2.

Thus, the difference in thermal response time between the LP shaft and the casing leads to considerable variations in the axial clearance to the interfaces between the low-pressure LP turbine and the stator for each stage. These variations relating to the axial displacements between the LP rotor and the stator are directly involved in the sizing of the turbine. Indeed the combination of the variations in axial clearance of each stage ultimately leads to an additional length which is equal to the number of stages multiplied by the value of the displacement between the rotor and the stator for each stage.

In addition, it has been proposed to radially interpose, between the HP shaft and the LP shaft, a sleeve which makes it possible to shield a portion of the LP shaft from the heat released by said combustion chamber, said portion being arranged overall to the right of the combustion chamber. This shielding solution accentuates the thermal response time of said portion of the LP shaft with respect to the casing and also with respect to the rest of the LP shaft.

However, the sealing between the axial end of the LP turbine and the casing is produced by means of a seal for which an optimal operating clearance must be maintained in all circumstances. Said clearance must be in particular between a minimum value, which ensures the lack of interference between the last journal of the LP turbine and the casing in all circumstances, and a maximum value which must be compensated by pressurising a vessel referred to as "downstream" inside the LP rotor, which contains bearing-type members of the LP turbine so that the stream gases of the LP turbine do not enter the vessel. It is thus advantageous to limit said clearance in order to limit the bleeding of air required to pressurise said vessel.

The purpose of the invention is to make the variation in clearance at the end of the LP shaft as low as possible by matching the thermal behaviour of the LP shaft and of the casing.

The invention thus aims to homogenize the thermal behaviour of the LP shaft in order to ensure a substantially simultaneous thermal evolution of the expansion of the LP rotor and of the stator.

A turbine engine rotor shaft, and in particular the LP shaft, naturally comprises at least one portion having an outer periphery having a determined diameter forming a free surface for heat exchange with the environment of said rotor, i.e. a surface which does not engage with another portion, but which is arranged in a free manner within a volume allowing air to circulate around said heat exchange surface. In particular, such an exchange surface corresponds to the portions of the LP shaft which are arranged outside the sleeve of the HP rotor, and in particular to the longest upstream portion.

In order to achieve the purpose of the invention, it is thus proposed to improve the thermal behaviour of the shaft of a rotor by increasing the free heat exchange surface of said portion.

Documents EP-2.518.429-A1, WO-2006/029843-A1, EP-2.093.381-A1 and US-2006/099073-A1 describe turbine engine elements comprising irregularities which are capable of increasing the free heat exchange surfaces of said elements. However, none of these documents relates to a turbine engine shaft.

The invention proposes a turbine engine rotor shaft comprising at least one portion which is thermally shielded from the environment of said rotor and at least one portion which is arranged outside the shielded portion and comprises a heat exchange portion, the outer periphery of which having a determined diameter forms a free surface for heat exchange with the environment of said rotor, characterised in that the outer periphery of the heat exchange portion comprises a plurality of irregularities which are designed to provide a heat exchange surface of the shaft of the rotor which is greater than a heat exchange surface which is associated with the periphery of a cylinder having the same determined average diameter.

According to other features of the invention, taken separately or in combination:
- the irregularities comprise at least some bumps,
- the bumps comprise at least some elements which are deposited on the periphery of the shaft,
- the elements comprise sub-micron-size ceramic particles which are sprayed onto the shaft by means of a suspension plasma spraying method onto a substrate adhering to the periphery of the shaft,
- the elements comprise metal particles glued to a substrate adhering to the periphery of the shaft,
- the irregularities comprise at least some cavities, the periphery comprises at least one circular groove forming the cavity.

the periphery comprises at least one longitudinal groove forming the cavity, the periphery comprises at least one thread having a determined nominal pitch and diameter forming the cavity.

The invention also proposes a turbine engine comprising a rotor shaft of a low-pressure body, a high-pressure body comprising a high-pressure compressor comprising bladings and discs, and a sleeve which is associated with one of the discs of the compressor, the sleeve covering and shielding a portion of the shaft of the low-pressure body, characterised in that the low-pressure rotor shaft comprises at least one heat exchange portion which is formed outside the sleeve and has an outer periphery having a determined diameter forming a free surface for heat exchange with the discs of the high-pressure compressor and comprising a plurality of irregularities which are designed to provide a heat exchange surface of the shaft of the rotor which is greater than a heat exchange surface which is associated with the periphery of a cylinder having the same determined average diameter.

According to another feature of the turbine engine, the heat exchange portion comprises, at the junction thereof with an upstream end of the sleeve, at least one longitudinal groove or one thread having a determined pitch, which is designed to suck a flow of air inside said sleeve.

The invention will be better understood, and other details, features and advantages of the present invention will become clearer upon reading the following description, given by way of non-limiting example with reference to the accompanying drawings, in which.

In the following description, same reference numerals denote parts which are the same or have similar functions.

Figure 1:
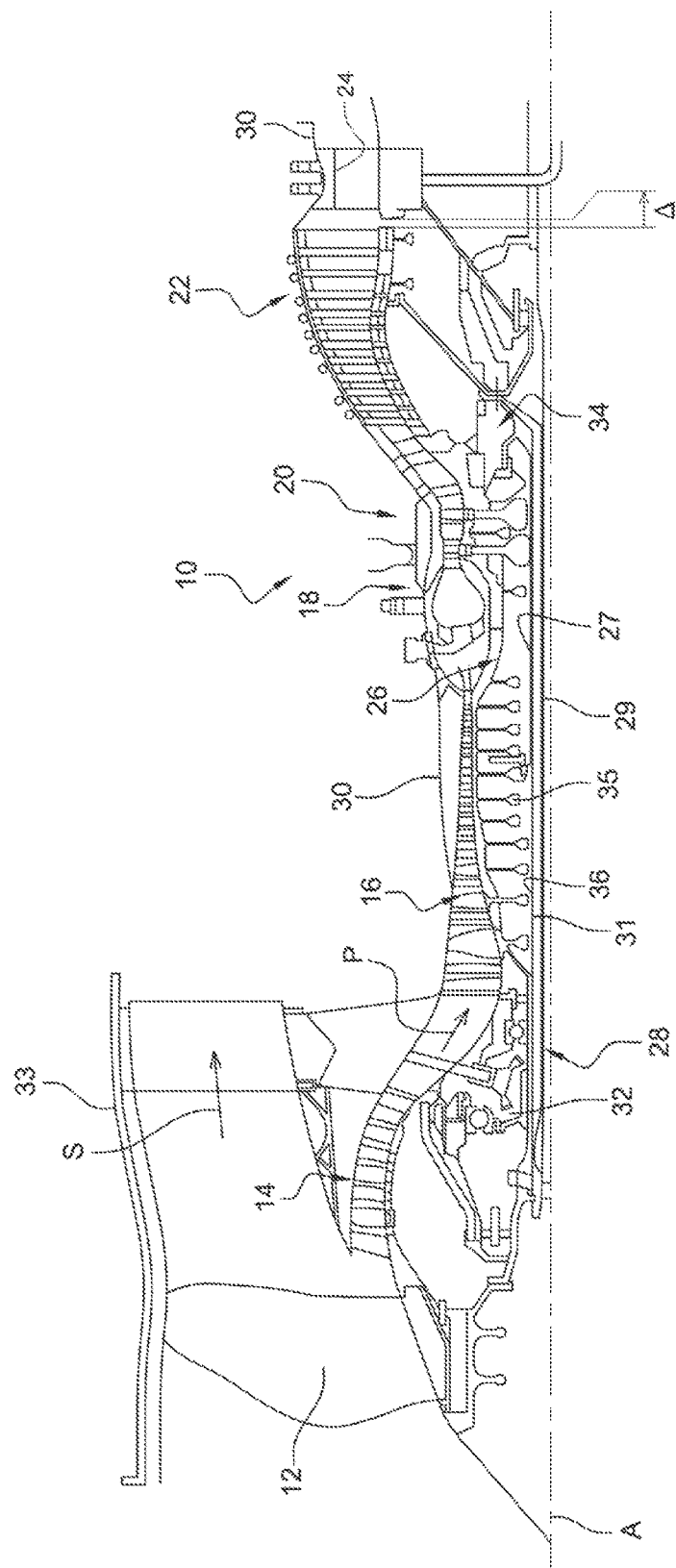
FIG. 1 is a longitudinal sectional view of a turbine engine comprising a LP rotor shaft according to the invention.

FIG. 1 shows a two-spool and bypass-type turbine engine 10. Such a turbine engine, in this case a bypass turbojet engine 10, comprises, in a known manner, a fan 12, a low-pressure compressor 14, a high-pressure compressor 16, a combustion chamber 18, a high-pressure turbine 20, a low-pressure turbine 22 and an exhaust pipe 24. The rotor of the high-pressure HP compressor 16 and the rotor of the high-pressure HP turbine 20 are connected by a high-pressure HP shaft 26 and form a high-pressure body therewith. The rotor of the low-pressure LP compressor 14 and the rotor of the low-pressure LP turbine 22 are connected by a low-pressure LP shaft 28 and form a low-pressure body therewith. Each compressor 14, 16 or turbine 20, 22 can consist of a plurality of compressor or turbine stages in series.

The HP shaft 26 and the LP shaft 28 extend along an axis A which is the global axis of the turbojet engine 10. In the rest of the description, the concepts of longitudinal or radial relate to said axis A.

Each of the low-pressure LP 28 and high-pressure HP 26 shafts are mounted so as to rotate in a casing 30 of the turbojet engine, the LP shaft 28 being coaxial with the HP shaft 26.

The turbojet engine 10 has, substantially in the region of the upstream end of the high-pressure body, a vessel referred to as "upstream" 32 containing bearing-type and gear-unit-type members and, substantially in the region of the downstream end of the high-pressure body, a vessel referred to as "downstream" 34 containing bearing-type members.

The LP shaft 28 has a substantially greater length than the HP shaft 26. The HP shaft 26 further comprises a sleeve 27 through which a portion 29 of the LP shaft 28 passes. This sleeve 27 makes it possible to protect a portion of the LP shaft 28 from the high heat caused by the proximity of the combustion chamber 18, as can be seen in the rest of the present description.

The high-pressure and low-pressure bodies are passed through by a primary air flow P and the fan 12 produces a secondary air flow S which flows in the turbojet engine 10 between the casing 30 and an outer sheath 33 of the turbojet engine. At the output of the LP turbine 22, the gases from the primary flow P are mixed with the secondary flow S to produce a propellant force, the secondary flow S providing the majority of the thrust.

In such a turbojet engine 10, the bladings of the LP 28 and HP 26 rotors and of the casing 30 are subjected to the temperature of the gases of the stream of the primary air flow P. The casing 30 surrounds the stream and supports the stator bladings. By contrast, the LP 28 and HP 26 shafts are located in cavities in which there is slight air movement and said shafts are thus subjected to a gradient of thermal expansion which is different from that of the casing 30. This phenomenon is even more accentuated for a dual-flow-type engine, for which the casing 30 is immersed in a flow of fresh air which is intended to cool it.

In particular, the LP shaft 28 comprises a long portion which extends inside the HP shaft and which is thus very far away from the bladings and the stream. This portion of the LP shaft 28 is therefore subjected to a temperature gradient which is substantially different from the gradient to which the casing 30 is subjected.

Thus, for a same initial length of the LP shaft 28 and the associated casing 30, the difference in thermal response time between the LP shaft 28 and the casing 30, i.e. the period of time at the end of which the expansion of these elements is at a maximum in the nominal operating conditions of the engine, leads to variations in the axial clearance to the interfaces between the LP turbine 20 and the casing 30 or stator, and this is the case for each stage. These variations relating to the axial displacements between the LP shaft 28 and consequently between the low-pressure rotor and the casing 30 are directly involved in the sizing of the LP turbine 22 of said rotor. The combination of the variations in axial clearance of each stage ultimately leads to an additional length "A" which is equal to the number of stages multiplied by the value of the displacement between the LP shaft 28 and the stator 30 for each stage and this additional length must be taken into account in the sizing of the LP turbine 22, in particular to prevent any interference between the last journal of the LP turbine 20 and the casing 30.

In addition, it has been proposed to radially interpose, between the HP shaft 26 and the LP shaft 28, a sleeve 27 which makes it possible to shield a portion 29 of the LP shaft 28 from the heat released by said combustion chamber 18, which portion is arranged overall to the right of the combustion chamber 18. This shielding solution accentuates the thermal response time of said portion 29 of the LP shaft 28 with respect to the casing 30 and also with respect to the rest of the LP shaft 28.

Furthermore, a portion 31 of the LP shaft 28 which extends upstream of said sleeve 27 can be located in the immediate vicinity of inner portions 35 of the discs of the HP compressor, or "leeks" which are capable of transmitting to the LP shaft 28 the heat coming from the combustion chamber 18.

However, the sealing between the axial end of the LP turbine 20 and the casing 30 is also a sizing factor. This sealing is produced by means of a seal for which an optimal operating clearance must be maintained in all circumstances. Said clearance must be in particular between a minimum value, which ensures, as explained previously, the lack of interference between the last journal of the LP turbine 20 and the casing 30 in all circumstances, and a maximum value which must be compensated by pressurising a vessel 34 referred to as "downstream" inside the LP rotor, which contains bearing-type members of the LP turbine so that the stream gases of the LP turbine 20 do not enter the vessel 34. It is thus advantageous to limit said clearance in order to limit the bleeding of air required to pressurise said vessel 34.

The purpose of the invention is to make the variation in clearance at the end of the LP shaft 28 as low as possible by matching the thermal behaviour of the LP shaft 28 along the whole length thereof and the casing 30.

The invention thus aims in particular to homogenize the thermal behaviour of the LP shaft 28 over the two portions 29 and 31 thereof in order to ensure a substantially simultaneous thermal evolution of the expansion of the LP rotor 28 and of the stator 30.

Figure 3:
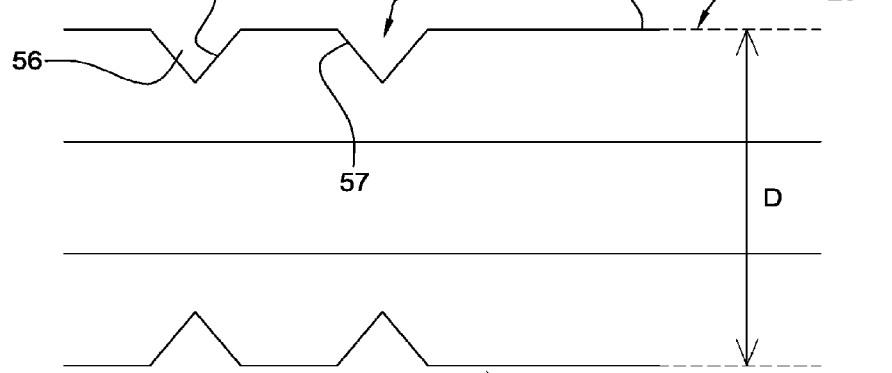
FIG. 3 is a longitudinal sectional half view of a low-pressure LP rotor shaft according to a second embodiment of the invention.
Figure 4:
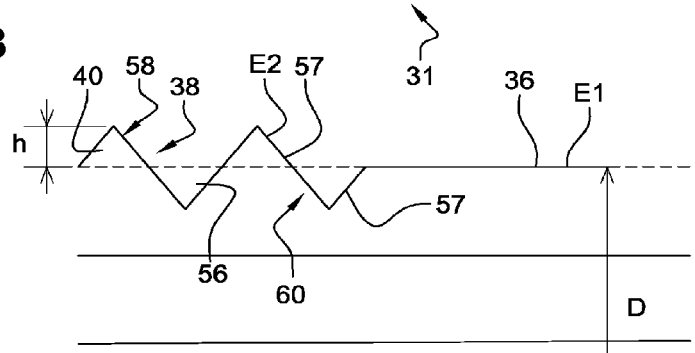
FIG. 4 is a longitudinal sectional half view of a low-pressure LP rotor shaft according to a third embodiment of the invention.

As shown in FIGS. 3 and 4, a turbine engine rotor shaft such as the LP shaft 28 naturally comprises at least one heat exchange portion corresponding to the portion 31 of the LP shaft 28, which has an outer periphery 36, which conventionally has a determined diameter "D", which is shown in dotted lines on the right-hand side of FIGS. 3 and 4, which forms a free heat exchange surface "E1".

In the rest of the present description, such a portion will be considered to be able to extend along the portion 31 of the LP shaft 28. However, this configuration is non-limiting and can relate to a portion which is arranged downstream of the sleeve 27, i.e. more generally all the portions of the LP shaft 28 which are arranged outside the sleeve 27.

The surface "E1" corresponds to the surface of the periphery of a cylinder having the determined average diameter "D". The portion 31 of the rotor shaft 28 is subjected to an air flow in the portion thereof which is outside the sleeve 27.

In order to achieve the objective of the invention, it is thus proposed to improve the thermal behaviour of a rotor, in particular of the low-pressure LP rotor, by increasing the free heat exchange surface of the portion 31 of the LP shaft 28 thereof in order to ensure simultaneity of the respective expansions of said low-pressure LP shaft 28 and of the casing 30.

For this purpose, the invention proposes a LP turbine engine shaft 28 of the type previously described, characterised in that the outer periphery 36 comprises a plurality of irregularities 38 which are designed to provide a heat exchange surface "E2" of the LP shaft 28 of the rotor which is greater than an exchange surface "E1" which is associated with the periphery of a cylinder having the same determined average diameter "D", as shown on the right-hand side of FIGS. 3 and 4.

In the rest of the description, the invention, as previously seen, is described with reference to the portion 31 of the LP rotor shaft 28 of a low-pressure body of a turbine engine which is outside the sleeve 27 of the tubular HP shaft of a high-pressure body of said turbine engine. It will of course be understood that this configuration, despite being a preferential configuration of the invention, is not limited to the LP shaft 28 and could be applied to any shaft of a turbine engine which can comprise irregularities for the purpose of increasing the free heat exchange surface thereof.

In accordance with the invention, the irregularities 38 comprise at least some bumps 40, i.e. portions projecting with respect to an initial or theoretical surface having an average diameter "D" of the outer periphery of the LP shaft 28 which is devoid of irregularities. It will thus be understood that the bumps 40 can be obtained by means of any known method from the prior art, regardless whether it is a method of machining a LP shaft 28 having an initial diameter "D", in which only the metal material of the shaft is shaped to form bumps, or whether it is a method for adding material, in which an additional filler metal is added to the LP shaft 28.

According to a first embodiment of the invention, the bumps 40 comprise at least some elements 42 which are deposited on the periphery of the LP shaft 28.

Figure 2:
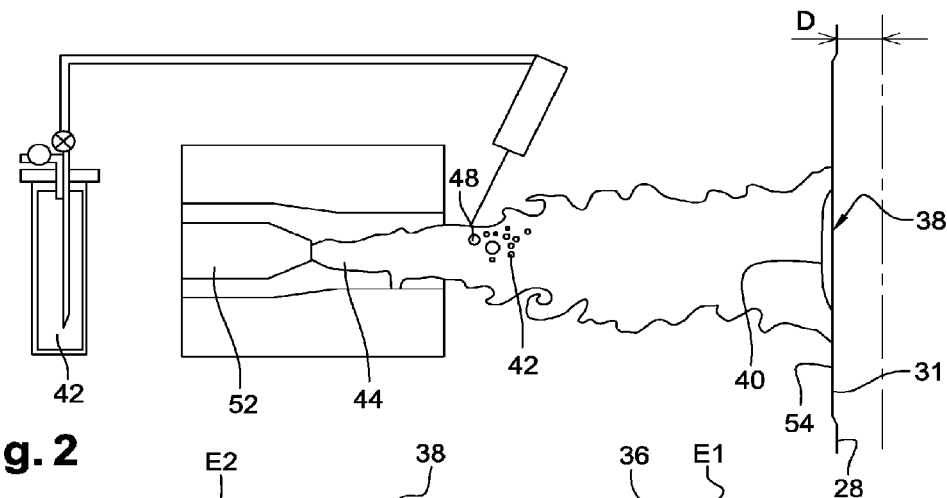
FIG. 2 is a schematic view showing the processing of a low-pressure LP rotor shaft according to the invention by means of a suspension plasma spraying method according to a first embodiment of the invention.

FIG. 2 shows by way of example a suspension plasma spraying method which makes it possible to obtain such bumps.

The suspension plasma spraying method, known under the abbreviation "SPS", makes it possible to obtain ceramic deposits having a thickness which varies between 1 and 50 μm. The low particle size distribution of the powders used necessitates the use of a carrier liquid due to the low dynamic inertia of the particles 42, in order to inject them into the core of a plasma jet 44. Elements consisting of particles 42 are thus placed in suspension in a tank 46 which is subjected to a compressed air pressure, then the particles 42 in suspension are injected in the form of drops 48 having a diameter of substantially 300 μm or of a jet having a diameter of substantially 150 μm in a plasma jet 44 produced by a plasma torch 52. The drops 48 or the jet are fragmented by the plasma jet into droplets 50 which contain solid particles 42 which, after vaporisation, are melted and sprayed onto a prepared substrate 54 on the surface of the LP shaft 28.

This method has the advantage of allowing the porosity of the deposits to be controlled by adjusting experimental parameters such as the arc current, the nature and flow of the plasma gases, the depositing distance and the particle size distribution of the powders. It also makes it possible to deposit a plurality of layers having different chemical compositions and porosities using one or more suspensions. In addition, it works in the open air with minor modifications to a conventional plasma spraying system.

In a variant (not shown), the elements 42 can consist of metal particles in the form of beads which are glued to a substrate 54 adhering to the periphery of the LP shaft 28.

In accordance with the invention, the irregularities 38 can comprise at least some cavities 56, independently of or in combination with the bumps 40. Cavities are thus understood to mean hollow regions which lack material with respect to an initial or theoretical surface having an average diameter "D" of the outer periphery of the LP shaft 28 which is devoid of irregularities. It will thus be understood that said cavities 56 can be obtained by means of any known method from the prior art, regardless whether it is a method of machining a LP shaft 28 having an initial diameter "D", in which only the metal material of the shaft is shaped to form cavities, or whether it is another method for removing material from the LP shaft 28, for example, and in a non-limiting manner, a spark erosion method. The cavities 56 make it possible to increase the exchange surface so as to provide a free exchange surface "E2" which is greater than the heat exchange surface "E1" which is associated with the periphery 36 of a cylinder having the same determined average diameter "D".

Preferably, according to second to fourth embodiments of the invention, the cavities 56 are obtained by means of a machining method.

FIG. 3 shows a second embodiment of the invention, in which the periphery 36 of the LP shaft 28 comprises at least one circular groove 56 forming the cavity. FIG. 3 shows a LP shaft 28 comprising a plurality of parallel grooves 56 having a V-shaped cross section, but it will be understood that this configuration has a non-limiting effect on the invention and that the grooves 56 could have any other profile. The exchange surface "E2" thus corresponds to the total surface of the periphery 36 of the shaft, including that of the edges 57 of the grooves 56.

FIG. 4 shows a third embodiment of the invention, in which the periphery 36 of the LP shaft 28 comprises at least one single thread 60 having a pitch "p" and a determined nominal diameter forming the cavity.

In the example shown here, the thread of the LP shaft 28 is produced for example by rolling and it delimits in the LP shaft 28, as can be seen in the section in FIG. 3, cavities 56 at the base of the thread 60, but also a helical tooth 58 having a height "h" forming bumps 40. The tooth 58 extends beyond the initial diameter "D" of the LP shaft 28 because it is formed by the material of the thread base which is embossed during the formation of the thread 60 obtained by rolling. The exchange surface "E2" thus corresponds to the total surface of the periphery 36 of the shaft, including that of the edges 57 of the thread 60.

By way of example, for a thread 60 comprising a tooth 58 having peaks of a height "h" which is equal to $\frac{1}{6}$ of the thickness of the LP rotor 28 and of a pitch "p" having a size which is equivalent to $\frac{1}{100}$th of that of the LP shaft 28, i.e. a height "h" and pitch "p" of approximately one hundredth of a millimeter, the increase over time in the thermal response of the LP shaft 28 with respect to the casing 30 can reach up to 33%.

A smooth LP shaft 28 having a length of 2 m would have an exchange surface of approximately 0.5 m$^2$. A similar shaft provided with teeth having a height "h" which is equal to 2.5 mm according to a pitch "p" of 3 mm, makes it possible to double the exchange surface.

It will be understood that this configuration has a non-limiting effect on the invention and that the thread 60 could comprise only cavities 56 in the case of a thread obtained by removing material.

Lastly, according to a fourth embodiment of the invention (not shown), the periphery 36 of the LP shaft 28 can comprise at least one longitudinal groove forming the cavity, or preferably a series of grooves distributed at angles in a regular manner, in order to ensure good balancing of the LP shaft 28.

Advantageously, the heat exchange portion 31 can comprise, at the junction thereof with an upstream end of the sleeve 27, at least one longitudinal groove or a thread 60 having a determined pitch of the above-mentioned type, which makes it possible to suck an air flow inside said sleeve 27, and to improve the cooling of the portion 29 of the LP shaft 28 by reducing the confinement thereof in the sleeve 27. Said longitudinal groove or a thread 60 having a determined pitch can be produced following on from or independently of irregularities 38 of another type.

The invention thus can be applied to any turbine engine comprising at least one LP rotor shaft 28 of the type previously described and to limit the impact of phenomena of differential expansion of the shafts, and in particular of the LP shaft 28.

Thus, the invention can be applied in a particularly advantageous manner to a turbine engine 10, comprising a LP rotor shaft 28 of a low-pressure body, a high-pressure body comprising a high-pressure compressor 16 comprising bladings and discs, and a sleeve 27 which is associated with one of the discs of the compressor 16, the sleeve 27 of said turbine engine 10 covering a portion of the rotor shaft 28 of the low-pressure body. In this configuration, the low-pressure rotor shaft 28 comprises at least one portion 31 forming a heat exchange portion outside the sleeve 27, which has an outer periphery having a determined diameter forming a free surface for heat exchange with the discs of the high-pressure compressor 16, and this makes it possible to substantially improve the thermal behaviour of the LP shaft 28 of the low-pressure rotor.

The invention claimed is:

1. A turbine engine comprising:
   a combustion chamber;
   a turbine engine rotor shaft; and
   an environment of said turbine engine rotor shaft submitted to heat caused by a proximity of said combustion chamber,
   said turbine engine rotor shaft including at least one portion which is thermally shielded from said environment of said turbine engine rotor shaft and a portion which is thermally exposed to said environment of said turbine engine rotor shaft, said portion which is thermally exposed including a heat exchange portion, an outer periphery of the heat exchange portion including a determined diameter and forms a free surface for heat exchange with the environment of said turbine engine rotor shaft,
   wherein the outer periphery of the heat exchange portion of said turbine engine rotor shaft includes a plurality of shaft surface structure irregularities which are designed to provide a first heat exchange surface of said turbine engine rotor shaft which is greater than a second heat exchange surface which is associated with a periphery of a cylinder including a same determined average diameter, and
   wherein at least a portion of the outer periphery of the heat exchange portion of said turbine engine rotor shaft that includes the plurality of shaft surface structure irregularities is disposed along a length of a compressor of the turbine engine.

2. The turbine engine according to claim 1, wherein the shaft surface structure irregularities include at least bumps.

3. The turbine engine according to claim 2, wherein the bumps include at least elements which are deposited on the outer periphery of the heat exchange portion of said turbine engine rotor shaft.

4. The turbine engine according to claim 3, wherein the elements include particles deposited on a substrate adhering to the outer periphery of the heat exchange portion of said turbine engine rotor shaft that are sub-micron-size ceramic particles which are sprayed onto said turbine engine rotor shaft by a suspension plasma spraying method onto the substrate adhering to the outer periphery of the heat exchange portion of said turbine engine rotor shaft, or metal particles glued to the substrate adhering to the outer periphery of the heat exchange portion of said turbine engine rotor shaft.

5. The turbine engine according to claim 1, wherein the shaft surface structure irregularities include at least one cavity.

6. The turbine engine according to claim 5, wherein the outer periphery of the heat exchange portion of said turbine engine rotor shaft includes at least one circular groove forming said at least one cavity.

7. The turbine engine according to claim 5, wherein the outer periphery of the heat exchange portion of said turbine engine rotor shaft includes at least one longitudinal groove forming said at least one cavity.

8. The turbine engine according to claim 5, wherein the outer periphery of the heat exchange portion of said turbine engine rotor shaft includes at least one thread including a determined nominal pitch and diameter forming said at least one cavity.

9. The turbine engine according to claim 1, wherein said turbine engine rotor shaft is a turbine engine rotor shaft of a low-pressure body passing through at least one sleeve of said turbine engine, the sleeve shielding a portion of said turbine engine rotor shaft from said low-pressure body, and wherein the heat exchange portion of said turbine engine rotor shaft is formed outside the sleeve.

10. The turbine engine according to claim 9, wherein the heat exchange portion of said turbine engine rotor shaft includes, at a junction thereof with an upstream end of the sleeve, at least one longitudinal groove or one thread including a determined pitch, which is designed to suck a flow of air inside said sleeve.

11. The turbine engine according to claim 4, wherein the particles are the sub-micron-size ceramic particles.

* * * * *